Figure 1:
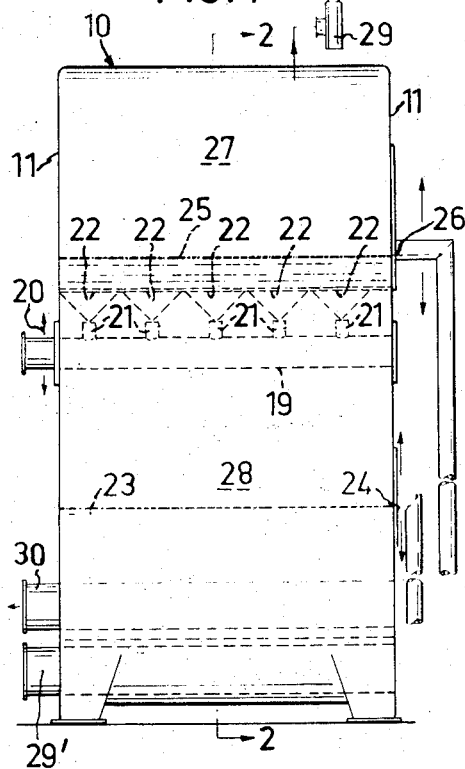

United States Patent [19]
Janson

[11] 3,789,978
[45] Feb. 5, 1974

[54] METHOD AND APPARATUS FOR SEPARATING FINER PARTICLES FROM COARSE PARTICLES SUSPENDED IN A LIQUID

[76] Inventor: Bengt Gotthard Janson, Vegagatan 8, Stockholm, Sweden

[22] Filed: Apr. 20, 1971

[21] Appl. No.: 135,685

[52] U.S. Cl.............. 209/10, 209/5, 209/250, 209/273, 210/42, 210/44
[51] Int. Cl.............................................. B03b 1/00
[58] Field of Search..... 209/250, 158, 160, 454, 17, 209/268, 250, 44, 352, 13, 474, 10, 5, 273; 210/446, 42, 44

[56] References Cited
UNITED STATES PATENTS

| | | | |
|---|---|---|---|
| 3,373,875 | 3/1968 | Krikorian | 209/273 X |
| 2,988,223 | 6/1961 | Janson | 209/250 X |
| 3,394,803 | 7/1968 | Kaye | 209/250 X |
| 3,286,844 | 11/1966 | Juell | 209/170 X |
| 3,524,548 | 8/1970 | McDonald et al. | 210/323 X |
| 719,913 | 2/1903 | Wackeron | 209/250 X |
| 3,024,911 | 3/1962 | Janson | 209/268 |
| 3,616,904 | 11/1971 | Aremaa | 209/273 X |

Primary Examiner—Frank W. Lutter
Assistant Examiner—William Cuchlinski, Jr.
Attorney, Agent, or Firm—Cushman, Darby & Cushman

[57] ABSTRACT

The present invention relates to a method and apparatus for separating finer particles from coarse particles suspended in a liquid by projecting the liquid, via a nozzle, in the form of a conical spray onto a screening member or strainer. A pressure difference is maintained between the pressures on either side of the screening means so that a portion of the liquid and finer particles together with a gas, such as air, are permitted to pass through the screening means to its outlet side whereas coarse particles are conducted away on the inlet side of the screening means. The invention is mainly characterized by a liquid column maintained on the outlet side of the screening means. This column communicates with the outlet side of said screening means.

11 Claims, 11 Drawing Figures

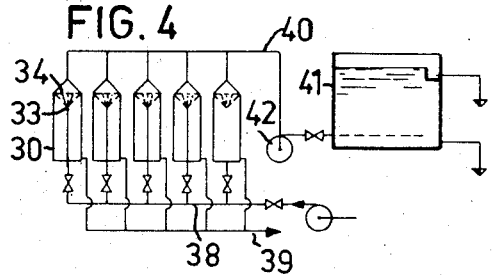
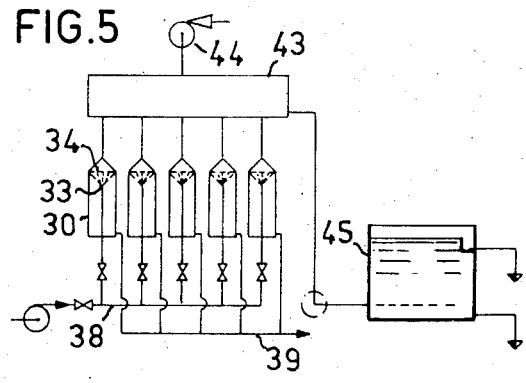
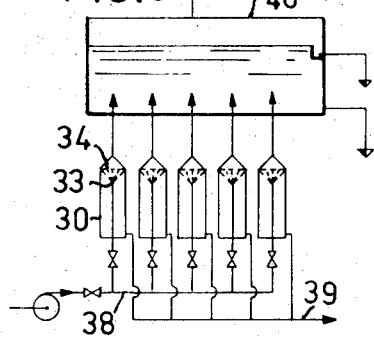
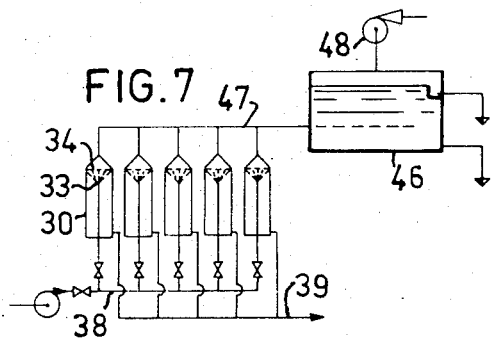

METHOD AND APPARATUS FOR SEPARATING FINER PARTICLES FROM COARSE PARTICLES SUSPENDED IN A LIQUID

The present invention relates to an apparatus for separating finer particles from coarse particles suspended in a liquid, by projecting the liquid in the form of a conical spray onto a screening means or strainer, such as a wire cloth or a perforated or slotted plate, wherein a pressure-difference is maintained between the pressures on either side of the screening means so that a portion of the liquid and finer particles together with a gas, such as air, are permitted to pass through the screening means to its outlet side, while coarse particles are conducted away on the inlet side of the screening means.

With known apparatus which operate in this way the liquid is sprayed against a vertical screening means or strainer whose outer side faces an air space. The liquid passing through the strainer together with the finer particles runs down along the outlet side of the strainer and the liquid is purged of air immediately it passes the strainer. Such apparatus operate satisfactorily provided that the difference between the pressures on either side of the strainer is maintained beneath a certain magnitude. The possibility of increasing this pressure difference is desirable, however, in order to enable the flow through the screening means to be increased, and the object of the present invention is therefore to provide a method and an apparatus by which the pressure difference can be increased without incurring those disadvantages obtained with known apparatus when the pressure difference is increased.

This object is achieved in accordance with the invention by means of a method which is mainly characterized in that there is established and maintained on the outlet side of the strainer a column of liquid in contact with the outlet side of the screening means. This simple, but novel expedient with respect to those methods hitherto used with known apparatus of the type in question has been found to provide considerable improvements. In addition to an increase in through-flow capacity, the method of the invention provides a mixture or dispersion of gas, such as air, in the liquid which can be utilized in a very advantageous manner in those instances when the liquid is passed to a flotation chamber for separation of the finer particles by flotation or sedimentation processes.

For carrying out the method of the invention, an apparatus can be used in which the attitude of the strainer or screening means therein can be arbitrarily selected under the condition that the outlet side of the strainer communicates with a liquid column. Thus, the strainer or screening means have a horizontal, a vertical or an inclined attitude, the one condition being in accordance with the invention that the outlet side of the strainer is in contact with the liquid column. The outlet side may be arranged to face upwards or downwards or may be situated on one side. It has been found experimentally that the strainer or screening means is suitably arranged in a horizontal position and sprayed from beneath, the liquid column being in contact with the upper surface of the strainer or screening means, this surface then forming the outlet side of said means.

Each strainer or screening means may be arranged in an individual housing structure to form a separate fractionating or screening component. A number of such components may then be combined together to form an apparatus according to the invention. Each component can be constructed so that it is easily assembled and disassembled, thereby permitting the screening means of each separate component to be readily exchanged if so desired.

In addition to the aforementioned advantages, it is also possible to use without disadvantage, at pressure differences which are relatively high when compared with those pressure differences possible with known apparatus, screening means which comprise two strainer cloths and a support grid structure. With known apparatus fiber fragments and like particles tend to pack in the interspace between the cloths, thereby impairing the efficiency of the strainer. It has been found that with an apparatus constructed in accordance with the invention this disadvantage is practically completely eliminated.

The method of the present invention and apparatus operating in accordance with the method are mainly intended for use in the cellulose and paper industry, but may also be used to advantage within other industries, such as the food production and processing industry.

As a result of the special conditions prevailing with screening means which operate in accordance with the invention, considerable advantages are obtained if the liquid is passed to a flotation chamber subsequent to passing the strainer or screening means. The liquid, fine particles and air, or other gaseous medium, are so intimately mixed together when passing through the screening means that the majority of the particles are carried on air bubbles. When the liquid enters the flotation chamber, an initial flocculation is obtained. By connecting the outlet sides of a number of strainers or screening means sequentially arranged in a straight line to the flotation chamber, a specific flow direction is obtained in the chamber in a direction towards its outlet. Thus, the concentration of rising particles is increased progressively as the flow obtains additions of particles from the screening means at different positions of the flow, each screening means delivering a certain quantity of particles to the flow. This progressive increase in the particle concentration affects the flocculation process in a particularly favourable manner. The flocculation time can be regulated in a simple manner, by setting the pressure difference between the pressures on either side of the screening means, thereby also permitting regulation of the addition of air bubbles to the liquid behind the screening means.

The method according to the invention can also be used with apparatus which are connected to a flotation chamber for removing solid particles from gases. The gas is mixed into the liquid in a manner whereby the solid particles in the gas become suspended in the liquid. The liquid is then projected in the form of a conical spray onto a screening means or strainer in a manner whereby the solid particles together with the gas pass through the means and continue to the liquid column communicating with the outlet side of the screening means. When the liquid reaches the flotation chamber, the solid particles are then removed by flotation or sedimentation.

The method of the invention will now be described in more detail with reference to a number of suitable embodiments of apparatus constructed in accordance with the invention.

Figure 3:
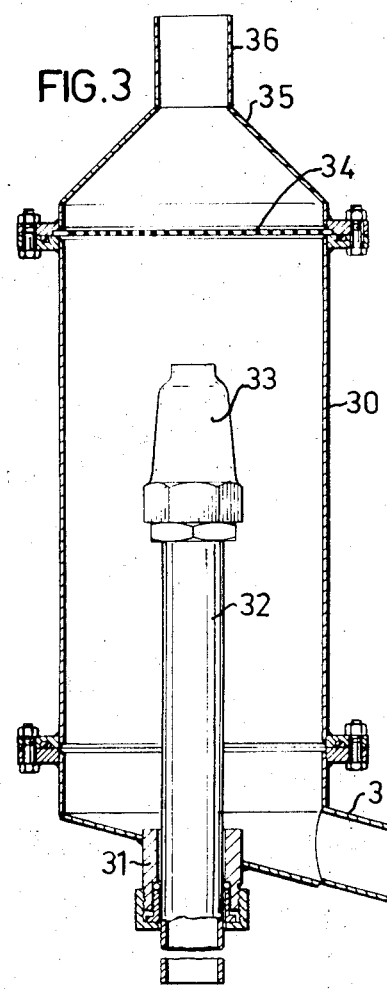
Figure 2:
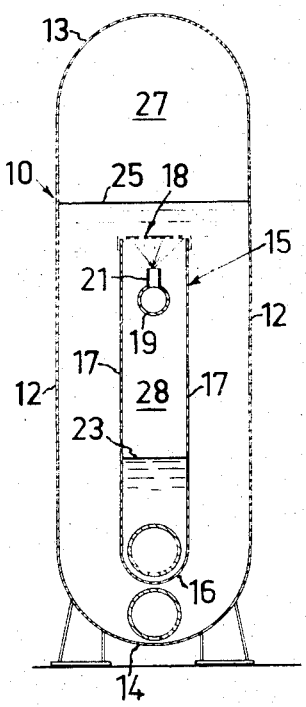
Figure 8:
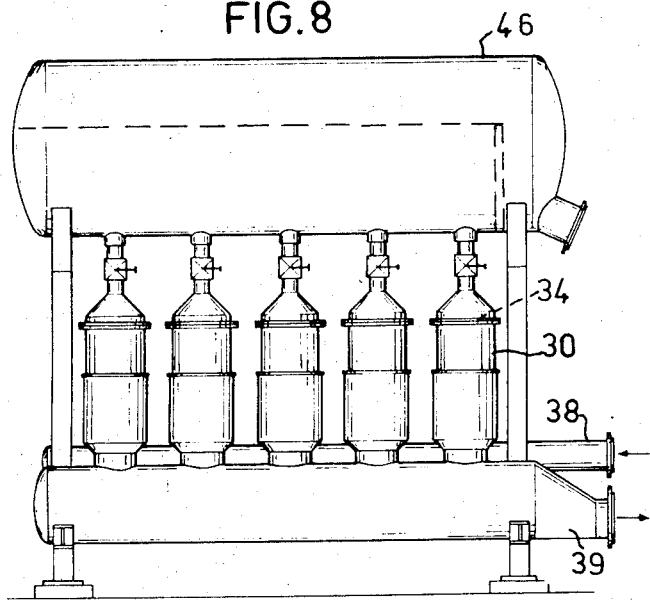
Figure 9:
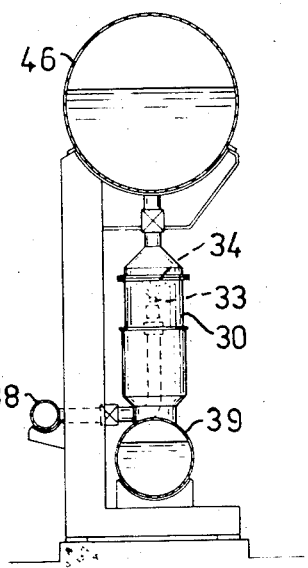
Figure 10:
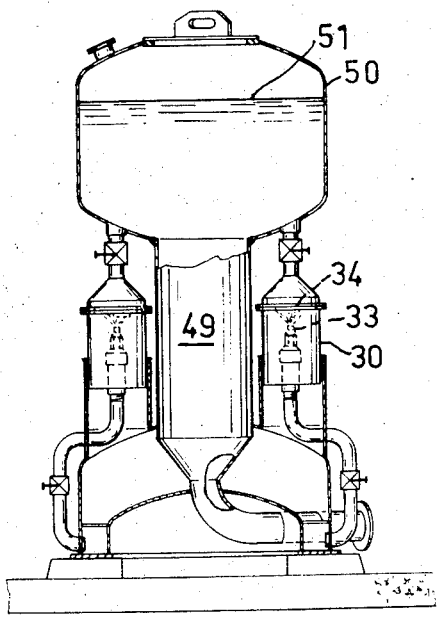
Figure 11:
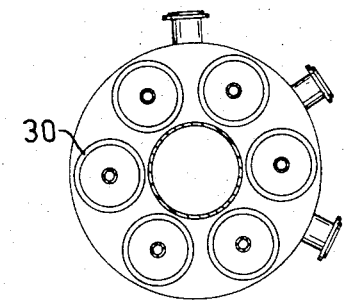

FIG. 1 is a side view of an apparatus according to the invention, FIG. 2 is a section taken through the line 2—2 in FIG. 1, FIG. 3 is an axial section through a fractionating component having the form of a housing provided with a nozzle and a screening means arranged according to the invention, FIGS. 4–7 illustrate diagrammatically different combinations of a number of fractionating components according to FIG. 3 for constructing apparatus which operate in accordance with the invention, FIG. 8 is a side view of an apparatus constructed according to the embodiment of FIG. 6, FIG. 9 is an end view of the apparatus illustrated in FIG. 8, FIG. 10 illustrates an apparatus having a number of fractionating components substantially similar to those illustrated in FIG. 3 and arranged around a central tube in a manner illustrated in FIG. 11 which is a cross section through the components in the apparatus illustrated in FIG. 10.

The apparatus illustrated in FIGS. 1 and 2 is designed to separate the finer particles from a suspension of coarse particles and also to provide for a subsequent flotation process in which the finer particles are separated from the vehicle liquid.

The apparatus is provided with a collecting chamber 10 having end walls 11, longitudinally extending side walls 12, an upper side 13 and a bottom 14.

A chamber 15 extends freely through the collecting chamber 10 between its end walls 11. The bottom 16 of the chamber 15 and its upper side 18 are connected by side walls 17.

Alternatively, two or more chambers 15 may be placed adjacent each other or several such chambers may be arranged transversely, instead of longitudinally as illustrated.

In each chamber 15 there is provided a liquid supply pipe 19, the liquid in the illustrated example being water containing coarse particles in the form of course fibres and fine particles in the form of finer fibres, fibre fragments and like particles. The pipe 19 can be raised and lowered, as indicated by the arrows 20.

Located on the pipe 19 is at least one spray nozzle 21 which delivers a conical jet having a vertical centre axis. In the illustrated example the pipe 19 is provided with five such nozzles 21.

Arranged in the upper wall 18 of the chamber 15 is one screening means 22 for each nozzle 21. The screening means are illustrated in the form of flat strainer cloths or screening plates, but may also be conical or dome-shaped. The distance of the nozzles 21 from the screening means 22 depends, inter alia, on the spray angle of the liquid cone, and is adjusted by raising or lowering the pipe 19.

When the apparatus is in operation, the liquid is sprayed against the under side of the screening means. In this way, the finer fibres are separated from the coarser fibres, owing to the fact that the latter are unable to pass through the screening means. A portion of the liquid is also collected in the chamber 15 and forms a liquid level 23, which is maintained constant by means of a spillway 24 for example. The spillway is capable of being adjusted vertically, as indicated by the arrows. The partially purified liquid which has not passed through the screening means is drained through a pipe 30 and recirculated to the apparatus.

A liquid level 25 which lies above the screening means is maintained in the collecting chamber 11. The liquid level 25 is maintained constant by means of, for example, a spillway 26 which is also vertically adjustable as indicated by the arrows.

The two chambers 10 and 15 have closed spaces 27 and 28 above the liquid levels 25 and 23, respectively. The pressure of air in the space 27 can be regulated to a desired subpressure by means of a pump or fan 29.

A higher pressure prevails in the space 28 than in the space 27. The difference in the pressures on the inlet and outlet side of the screening means adjacent said means is thus dependent on the gas pressure on the inlet side of the screening means in relation to the liquid column which is in contact with the outlet side of the screening means, and the gas pressure on the liquid column. In certain instances, the gas pressure on the liquid column may be greater than atmospheric pressure and in such instances the gas pressure on the inlet side of the screening means must be of a correspondingly higher gauge pressure in order to obtain the desired magnitude of pressure difference. In the majority of cases, however, it is suitable that a subpressure prevails on the outlet side of the screening means.

The pressure difference selected is dependent, among other things, on the nature of the screening means, the pressure of the spray jet, the height of the liquid column, i.e., the height of the liquid lever 25 above the screening means in the embodiment of FIGS. 1 and 2, and the nature of the particles in the liquid. If the apparatus is connected to a flotation chamber such as that illustrated in FIGS. 1 and 2 the desired flocculation of the particles in the collecting chamber is also a factor which determines the suitable pressure difference at the screening means.

Air can be mixed with the liquid arriving at the pipe 19 to a greater or lesser extent. Air is also present in the space 28. When the liquid is sprayed against the screening means 22, the desired amount of air will pass through the screening means together with liquid and finer particles such as fibre fragments and the like. By mixing the air in an atomized state, air bubbles are created which afford the aforementioned advantages. When the fibre flocs are collected on the surface of the liquid they are discharged at the spillway 26 and the purified water is removed through the bottom pipe 29'.

FIG. 3 illustrates a fractionating component in the form of a housing 30, the operation of which corresponds to the chamber 15 illustrated in FIG. 2. Located at the bottom of the housing is a guide structure 31 for a pipe 32 which is capable of being raised and lowered and which is provided at its upper end with a nozzle 33 for spraying liquid in the form of a conical jet. The jet is arranged to impinge on the under surface of a screening means 34, which may consist of two screening cloths and a supporting grid structure. Above the screening means, the cylindrical main portion of the housing is provided with a conical upper portion 35 which is detachably secured to the cylindrical house portion. The screening means 34 can be easily removed, by detaching the cylindrical house portion from the conical upper portion 35. The upper portion 35 merges with an outlet pipe 36 which may be connected up in any of the ways illustrated in FIGS. 4–11.

When the apparatus is in operation, the liquid column is formed above the screening means 34, and according to the invention, communicates with the outlet side of the screening means.

The coarser particles unable to pass through the screening means fall back and are collected together with a portion of the liquid on the bottom floor of the housing and depart through an outlet pipe 37.

A plurality of housings or fractionating components 30 having substantially the same construction as that illustrated in FIG. 3 may be combined together to form an apparatus according to the invention in any of the ways illustrated in FIGS. 4–11.

FIG. 4 illustrates a number of fractionating components 30 arranged in a row one behind the other. Liquid containing coarse and fine particles and air is passed in through a common line 38 to the nozzles 33 in the components 30, and is sprayed against the screening means 34. Liquid and coarse particles depart at the bottom floors of the housings through lines to a common outlet line 39. Liquid, air and fine particles pass through the screening means and, in the illustrated embodiment, are conducted through a common line 40 to a flotation chamber 41. Located in the line 40 is a pump 42 and a pressure regulator (not shown) which regulates the pressure in the line and therewith the pressure at the outlet side of the screening means.

FIG. 5 illustrates an apparatus which differs from the apparatus illustrated in FIG. 4 insofar as the upper ends of the components are connected behind the screening means 34 to a common collecting chamber 43, in which the pressure is regulated by means of a vacuum pump 44 and a pressure regulator (not shown) in a manner to obtain the desired setting of the pressure on the outlet sides of the screening means. Liquid containing fine particles is then passed to a flotation chamber 45.

FIG. 6 illustrates another embodiment in which the lines located behind the screening means are connected directly to a common flotation chamber 46.

FIG. 7 illustrates a further embodiment in which the lines are connected behind the screening means 34 to a common line 47 which discharges into a flotation chamber 46 in which the pressure is regulated by means of a vacuum pump 48 and a pressure regulator (not shown) for setting the desired pressure at the outlet sides of the screening means.

FIG. 8 illustrates diagrammatically the structural design of an apparatus which comprises a number of fractionating components or housing 30 arranged in sequential, in-line relationship and which are connected above the screening means 34 to a common collecting chamber 46. The bottom ends of the housing are connected to a common outlet line 39.

In the embodiment illustrated in FIG. 10 the components or housings 30 are arranged in a ring around a central outlet pipe 49 which departs from a collecting chamber 50, in which the liquid level 51 is maintained constant by means, for example, of a known level regulator. Such a regulator may also be used to maintain the level constant in the chamber 46 of the embodiment illustrated in FIG. 8 instead of the spillway described with reference thereto.

With the apparatus illustrated in FIG. 10, the liquid surface 51 is purged of air to a certain extent, owing to the fact that the larger air bubbles have a higher rising velocity while the smaller and slower air bubbles are unable to reach the surface, but accompany the stream down into the pipe 49 to be optionally utilized at a later stage in a subsequent flotation process.

I claim:

1. A method of separating finer particles from coarser particles both suspended in a liquid comprising: introducing and maintaining a gas in a gas space; spraying a particle-containing liquid through the gas space against the inlet side of a screening means and flowing a portion of the liquid in mixture with gas and containing finer particles through the screening means thereby forming gas bubbles while simultaneously conducting coarser particles away from the inlet side of the screening means; maintaining in contact with the outlet side of the screening means a column of said liquid into which the mixture of liquid and gas bubbles flows; and maintaining a pressure difference between the pressures on either side of the screening means such that said column and said flow through the screening means is maintained.

2. A method as in claim 1 wherein the screening means is disposed so that its inlet side faces generally downwardly and wherein the liquid is sprayed generally upwardly against the downwardly facing inlet side.

3. A method as in claim 1 wherein the screening means extends in substantially a horizontal plane and wherein the liquid is sprayed substantially vertically upwardly against the underside of the screening means.

4. A method as in claim 1 wherein the screening means extends at an angle to a horizontal plane.

5. A method as in claim 1 including passing the liquid containing finer particles and gas from the screening means to a flotation chamber and separating the finer particles from the liquid in the flotation chamber.

6. A method for separating finer particles from coarser particles both suspended in a liquid comprising: arranging a screening means capable of passing only finer particles so that it exhibits a downwardly facing surface and an upwardly facing surface; arranging and maintaining a body of liquid of uniform thickness in contact with the upwardly facing surface of the screening means; spraying liquid containing suspended particles upwardly through a gas space against the downwardly facing surface of the screening means while introducing and maintaining a gas in the gas space so that a portion of the liquid in mixture with gas and containing finer particles flows through the screening means into the body of liquid in the form of bubbles suspended in liquid; and so that coarser particles are conducted away from the downwardly facing surface of the screening means; maintaining a pressure difference between the fluid pressures on opposite sides of the screening means such that the body of liquid in contact with the upwardly facing surface of the screening means in maintained in the form of a column and such that the flow through the screening means is maintained; allowing the gas bubbles to rise and thereby carry finer particles to the surface; and discharging the floating finer particles.

7. Apparatus for separating finer particles from coarser particles both suspended in a liquid comprising: walls forming a gas-containing chamber and a chamber containing a body of liquid; screening means capable of passing only finer particles, said chambers being in communication with each other through said screening means; a nozzle in said gas chamber for projecting the liquid containing suspended particles in the form of an outwardly diverging conical spray onto one side of said screening means to thereby pass a portion of the liquid containing finer particles together with gas through the screening means thereby forming gas bubbles while simultaneously conducting coarser particles away from said one side of said screening means; and means for maintaining the liquid in said liquid-containing chamber in contact with the other side of said screening means in the form of a liquid column into which said bubbles flow, said means including means for introducing and maintaining a gas in said gas-containing chamber and for maintaining a pressure differential across said screening means such that the pressure in said liquid-containing chamber is less than the pressure in said gas-containing chamber whereby said flow through said screening means is maintained.

8. Apparatus as in claim 7 including a plurality of said chambers and respective screening means and nozzles wherein each screening means is disposed generally horizontally and wherein each nozzle sprays its conical spray upwardly onto the underside of its respective screening means, each liquid-containing chamber having an outlet line for liquid containing finer particles and gas, all said outlet lines being connected to discharge into a common collecting chamber, each gas-containing chamber having an outlet line for liquid containing coarser particles.

9. Apparatus as in claim 8 wherein said plurality of chambers are arranged in a straight line.

10. Apparatus as in claim 8 wherein said plurality of chambers are arranged in uniform spaced-apart relationship in a closed path.

11. Apparatus for separating finer particles from coarser particles suspended in a liquid comprising: a plurality of housings arranged below a common liquid-containing chamber, each of said housings being divided interiorly into an upper chamber and a lower chamber by a screening means having a lower surface and an opposite upper surface; a nozzle in each lower chamber for spraying liquid containing suspended particles and gas in the form of an upwardly and outwardly diverging conical spray onto the lower surface of the respective screening means to thereby pass a portion of the liquid containing finer particles together with gas through the screening means; conduit means connecting the upper end of each upper chamber to said common chamber at a level below the liquid level in said common chamber; and means introducing and maintaining a gas in said lower chambers and maintaining a pressure difference between the fluid pressure in said common chamber and the fluid pressures in said lower chambers such that the liquid in said common chamber is maintained as a liquid column in contact with the upper surfaces of said screening means and such that said flow through said screening means is maintained.

* * * * *

UNITED STATES PATENT OFFICE
CERTIFICATE OF CORRECTION

Patent No. 3,789,978      Dated February 5, 1974

Inventor(s) Bengt Gotthard Janson

It is certified that error appears in the above-identified patent and that said Letters Patent are hereby corrected as shown below:

On the cover sheet inster

-- [30] Foreign Application Priority Data

April 22, 1970      Sweden      5553/1970 --.

Signed and sealed this 24th day of September 1974.

(SEAL)
Attest:

McCOY M. GIBSON JR.      C. MARSHALL DANN
Attesting Officer      Commissioner of Patents